United States Patent
Daniere et al.

(10) Patent No.: US 10,246,579 B2
(45) Date of Patent: Apr. 2, 2019

(54) THERMOPLASTIC COMPOSITION COMPRISING POLYETHYLENE, MANUFACTURE AND USE THEREOF

(71) Applicant: Autoneum Management AG, Winterthur (CH)

(72) Inventors: Pierre Daniere, Milford, MI (US); Santiago Clara, Winterthur (CH); Wilfried Junghans, Frauenfeld (CH)

(73) Assignee: AUTONEUM MANAGEMENT AG, Winterthur (CH)

( * ) Notice: Subject to any disclaimer, the term of this patent is extended or adjusted under 35 U.S.C. 154(b) by 302 days.

(21) Appl. No.: 15/125,301

(22) PCT Filed: Mar. 4, 2015

(86) PCT No.: PCT/EP2015/054540
§ 371 (c)(1),
(2) Date: Sep. 12, 2016

(87) PCT Pub. No.: WO2015/135815
PCT Pub. Date: Sep. 17, 2015

(65) Prior Publication Data
US 2017/0081508 A1  Mar. 23, 2017

(30) Foreign Application Priority Data

Mar. 12, 2014 (EP) .................................. 14159028

(51) Int. Cl.
| | | |
|---|---|---|
| *C08L 23/06* | (2006.01) | |
| *C08L 23/08* | (2006.01) | |
| *B32B 5/02* | (2006.01) | |
| *B32B 27/12* | (2006.01) | |
| *B32B 27/32* | (2006.01) | |
| *C08K 3/04* | (2006.01) | |
| *C08K 3/22* | (2006.01) | |
| *C08L 91/00* | (2006.01) | |

(52) U.S. Cl.
CPC .............. *C08L 23/06* (2013.01); *B32B 5/022* (2013.01); *B32B 27/12* (2013.01); *B32B 27/32* (2013.01); *C08K 3/04* (2013.01); *C08K 3/22* (2013.01); *C08L 23/0815* (2013.01); *C08L 91/00* (2013.01); *B32B 2250/02* (2013.01); *B32B 2307/102* (2013.01); *B32B 2307/56* (2013.01); *B32B 2605/08* (2013.01); *C08L 2205/025* (2013.01); *C08L 2205/03* (2013.01)

(58) Field of Classification Search
CPC . C08L 2205/025; C08L 23/0815; C08L 23/06
See application file for complete search history.

(56) References Cited

U.S. PATENT DOCUMENTS

| | | | |
|---|---|---|---|
| 4,438,228 A | | 3/1984 | Schenck |
| 4,593,062 A | * | 6/1986 | Puydak .................. C08L 23/02 524/426 |
| 6,472,042 B1 | | 10/2002 | Dibbern et al. |
| 7,357,971 B2 | | 4/2008 | Bieser et al. |
| 8,896,897 B2 | | 11/2014 | Pinter et al. |
| 8,912,271 B2 | | 12/2014 | Seliskar et al. |
| 2003/0187129 A1 | | 10/2003 | Bell et al. |
| 2010/0272946 A1 | | 10/2010 | Pepper et al. |
| 2012/0064281 A1 | | 3/2012 | Taylor et al. |
| 2013/0209774 A1 | | 8/2013 | Shirodkar et al. |
| 2015/0140260 A1 | | 5/2015 | Taylor et al. |

* cited by examiner

*Primary Examiner* — Wenwen Cai
(74) *Attorney, Agent, or Firm* — Lewis Brisbois Bisgaard & Smith LLP; Craig W. Mueller

(57) ABSTRACT

Thermoplastic composition, comprising at least components (i) to (iii): (i) from 10 to 50% by weight of a combination of at least one first ethylene polymer (A) and at least one second ethylene polymer (B), wherein (A) is selected such as to exhibit (a) a density of from 0.87 g/cm³-0.90 g/cm³ as determined according to ASTM D792; (β) a melt flow index of from 0.3 g/10 min-5 g/10 min as determined according to ASTM D1238 (190° C./2.16 kg); (γ) a flexural modulus of from 5 to 60 MPa measured according to ASTM D790; and wherein (B) is selected such as to exhibit (a) a density of from 0.90 g/cm³-0.92 g/cm³ as determined according to ASTM D792; (β) a melt flow index of from 0.3 g/10 min-10 g/10 min as determined according to ASTM D1238 (190° C./2.16 kg); (γ) a flexural modulus which is higher than that of (A); (ii) from 35-90% by weight of inorganic particles as filler; (iii) from 0.05-20% by weight of a liquid (at 23° C.) as a plasticizer for the at least one first ethylene polymer (A) and/or the at least one second ethylene polymer (B); the % by weight of components (i) to (iii) being based on the total weight of the composition.

11 Claims, 1 Drawing Sheet

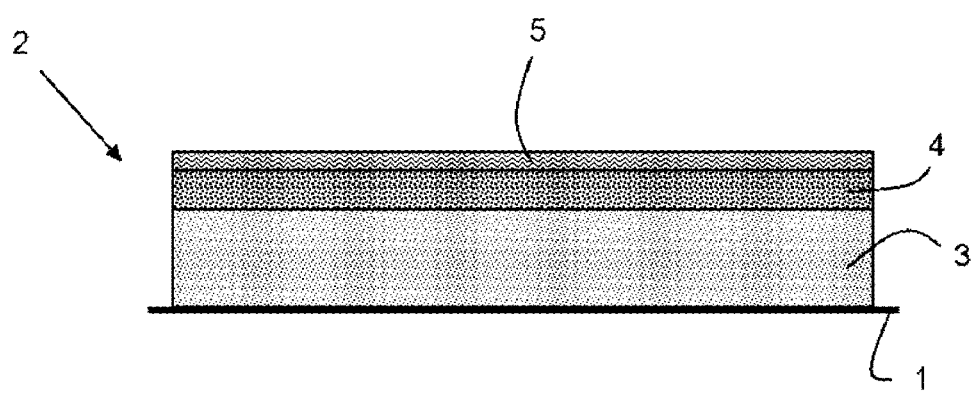

THERMOPLASTIC COMPOSITION COMPRISING POLYETHYLENE, MANUFACTURE AND USE THEREOF

The invention relates to a thermoplastic composition comprising at least two different ethylene polymers, to the manufacture and to the use thereof. The composition according to the invention is particularly useful in the manufacture of articles which function as acoustic insulators, i.e. which have sound reducing or sound deadening properties. The invention further relates to an acoustic insulator comprising the thermoplastic composition, to a composite comprising the thermoplastic composition, the composite being preferably in the form of a mass-spring system, and to a barrier layer of a mass-spring system, wherein the barrier layer comprises said thermoplastic composition.

BACKGROUND OF THE INVENTION

The sources of noise in a vehicle include, among others, power train, driveline, tire contact patch (excited by the road surface), brakes, and wind. The noise generated by all these sources inside the vehicle's cabin covers a rather large frequency range that, for normal diesel and petrol vehicles, can go up to 6.3 kHz. Above this frequency, the acoustical power radiated by the noise sources in a vehicle is generally negligible.

It is known to use insulators, dampers and absorbers for noise attenuation in vehicles like cars and trucks to reflect and dissipate sound and thus to reduce the overall interior sound level. Such noise attenuation is typically obtained by means of a "mass-spring" system. Herein, the mass element is formed by a layer of a relatively high density impervious material, which is termed as "barrier layer," or "heavy layer". The spring element is formed by a layer of relatively low density material like a non-compressed felt, fleece or foam.

The stiffness of the spring is comparable to the sum of the compressibility of the air in the decoupling layer and the stiffness of its skeleton. The thickness of the noise insulation materials used is normally predetermined by the vehicle manufacturer. If this is the case, and in particular where the insulating layer has a substantially uniform thickness, changes in the resonance frequency can be carried out by increasing the mass. The function of the insulator is highly dependent on the area weight and density of the barrier layer. Typically, the insulator quality increases with increasing weight of the barrier layer. However, since the weight has a direct impact on the amount of fuel used during driving, the weight of the barrier layer is to be restricted since less weight is an economic and ecological requirement. Thus, a trend towards lower weights for the mass layer or barrier layer for classical mass-spring systems can be observed. Accordingly, recently the average area weight of a barrier layer having a thickness of from 1-4 mm has decreased from 6-7 kg/m$^2$ to 2-3 kg/m$^2$. Further reducing the weight of the barrier layer down to 1.5 kg/m$^2$ or less would also reduce the insulation performance. However, with a strict requirement on low weight a balance between the acoustic performance and weight saving has to be found. For an acoustician, it is an advantage to have at disposal also a very low area weight for the barrier layer of an insulating part. An overall good acoustic performance of the vehicle would then be obtained through other measures, even though a lower level of insulation is used for some parts. Among these are, for example, a better acoustic design of the part (higher insulation of the accessories or more favourable thickness distribution), support of the insulation function with additional absorption, for an overall effect on the sound pressure level, and/or coupling of the light barrier layer to a better performing spring decoupler.

With the actual minimum area weight of around 2.5 kg/m$^2$ for the barrier layer, there isn't any possible weight adaptation for an insulator. The corresponding minimum weight for each barrier layer foam part cannot be reduced if a lighter barrier layer is not used.

WO 2012/119654 discloses a sound attenuating trim part, comprising at least one insulating area with acoustic mass-spring characteristics comprising at least a mass layer and a decoupling layer adjacent to the mass layer, whereby the mass layer consists of a porous fibrous layer and a barrier layer. The decoupling layer and all layers are laminated together. The mass layer, i.e. the impervious barrier layer, can be made of highly filled dense materials which may include a thermoset plastic including ethylene vinyl acetate (EVA) copolymer, high density polyethylene, low polyethylene, linear low density polyethylene, polypropylene, thermoplastic elastomer or rubber, polyvinyl chloride or any combinations thereof.

WO 2012/039733 relates to filled thermoplastic polyolefin compositions useful, e.g., as sound-deadening sheeting for formed automotive applications comprising a propylene polymer having a density equal to or greater than 0.885 g/cm$^3$, one or more linear ethylene polymer(s) and/or substantially linear polymer(s), a plasticizer, and a filler. Comparison example C* of this reference relates to a composition containing no propylene polymer but a combination of a substantially linear ethylene-octene copolymer having a density of 0.875 g/cm$^3$ and a melt flow index of 3 g/10 min at 190° C. under a load of 2.16 kg and a low density polyethylene having a density of 0.921 g/cm$^3$ and a melt flow index of 0.22 g/10 min at 190° C. under a load of 2.16 kg. Thermoformed articles prepared from this composition and which are stacked do not exhibit a sufficient stiffness in order to be shipped.

U.S. Pat. No. 4,438,228 relates to filled thermoplastic compositions useful, e.g., as sound-deadening sheeting for automotive carpet. The compositions are obtained by blending about 5-55% by weight of ethylene/α-olefin copolymer, the α-olefin containing from 4 to 10 carbon atoms, about 2-12% by weight of plasticizer selected from the group consisting of processing oils, epoxidized oils, polyesters, polyethers and polyether esters, about 40-90% by weight of filler, and optionally elastomeric polymers. Replacement of the ethylene/α-olefin copolymer by low-density polyethylene homo-polymer results in products having reduced stiffness and which are not suitable for the intended use. The same applies when part of the ethylene/α-olefin copolymer is replaced by an elastomeric polymer such as ethylene-propylene-diene monomer (EPDM) rubber.

OBJECT OF THE INVENTION

One object of the invention is to provide an improved material useful for the manufacture of acoustic insulators, which preferably can be processed into a thin layer, preferably in sheet form having a thickness in the range of from 0.2 to 5 mm and an area weight in the range of from 0.8 to 1.2 kg/m$^2$, further preferably wherein said thin layer may be used as a barrier layer of an acoustic system, while maintaining a stiffness that is high enough in order to allow the material to be shipped in stacked form without damage.

SUMMARY OF THE INVENTION

This object is achieved with a composition comprising at least two different ethylene polymers (A) and (B), a filler and a plasticizer.

According to a first aspect, the invention relates to a thermoplastic composition comprising at least components (i) to (iii):
(i) from 10 to 50% by weight of a combination of at least one first ethylene polymer (A) and at least one second ethylene polymer (B),
wherein said first ethylene polymer (A) exhibits
(A1) a density of from 0.87 g/cm$^3$-0.90 g/cm$^3$ as determined according to ASTM D792;
(A2) a melt flow index of from 0.3 g/10 min-5 g/10 min as determined according to ASTM D1238 (190° C./2.16 kg);
(A3) a flexural modulus of from 5 to 60 MPa measured according to ASTM D790;
and wherein said at least one second ethylene polymer (B) exhibits
(B1) a density of from 0.90 g/cm$^3$-0.92 g/cm$^3$ as determined according to ASTM D792;
(B2) a melt flow index of from 0.3 g/10 min-10 g/10 min as determined according to ASTM D1238 (190° C./2.16 kg);
(B3) a flexural modulus which is higher than that of (A);
(ii) from 35-90% by weight of particles as filler, preferably inorganic particles;
(iii) from 0.05-20% by weight of a liquid (at 23° C.) as a plasticizer for the at least one first ethylene polymer (A) and/or the at least one second ethylene polymer (B);
the % by weight of components (i) to (iii) being based on the total weight of the composition.

In one embodiment, the composition contains no propylene polymer having a density equal to or greater than 0.885 g/cm$^3$.

In alternative embodiments, not only a propylene polymer having a density equal to or greater than 0.885 g/cm$^3$ is excluded from the composition according to the invention, but any propylene polymer, ethylene vinyl acetate (EVA) copolymer, high density polyethylene, thermoplastic rubber, polyvinyl chloride, or any combination thereof.

In a further embodiment, the composition according to the invention further comprises at least a third polyethylene polymer (C) which exhibits (C1) a density of from 0.92 g/cm$^3$-0.97 g/cm$^3$ as determined according to ASTM D792; and (C2) a melt flow index of greater than 10 g/10 min-100 g/10 min as determined according to ASTM D1238 (190° C./2.16 kg).

In a further embodiment, any polymer being different from said at least one first ethylene polymer (A), said at least one second ethylene polymer (B) and said at least one third ethylene polymer (C), if present, and which has repeating units derived from an olefinic monomer, is excluded from the composition according to the invention.

In a further embodiment, the third polyethylene polymer (C) exhibits
(C1) a density of from 0.92 g/cm$^3$-0.95 g/cm$^3$ as determined according to ASTM D792;
(C2) a melt flow index of from 20 g/10 min-90 g/10 min as determined according to ASTM D1238 (190° C./2.16 kg); or
(C1) a density of from 0.925 g/cm$^3$-0.935 g/cm$^3$ as determined according to ASTM D792;
(C2) a melt flow index of from 30 g/10 min-80 g/10 min as determined according to ASTM D1238 (190° C./2.16 kg).

In one embodiment, (A) exhibits
(A1) a density of from 0.87 g/cm$^3$-0.89 g/cm$^3$ as determined according to ASTM D792;
(A2) a melt flow index of from 0.5 g/10 min-3 g/10 min as determined according to ASTM D1238 (190° C./2.16 kg);
(A3) a flexural modulus of from 10 to 50 MPa measured according to ASTM D790;
(B) exhibits
(B1) a density of from 0.90 g/cm$^3$-0.92 g/cm$^3$ as determined according to ASTM D792;
(B2) a melt flow index of from 0.5 g/10 min-7 g/10 min as determined according to ASTM D1238 (190° C./2.16 kg); or
(A) exhibits
(A1) a density of from 0.87 g/cm$^3$-0.89 g/cm$^3$ as determined according to ASTM D792;
(A2) a melt flow index of from 0.5 g/10 min-3 g/10 min as determined according to ASTM D1238 (190° C./2.16 kg);
(A3) a flexural modulus of from 10 to 40 MPa measured according to ASTM D790;
(B) exhibits
(B1) a density of from 0.90 g/cm$^3$-0.92 g/cm$^3$ as determined according to ASTM D792;
(B2) a melt flow index of from 0.5 g/10 min-1.5 g/10 min as determined according to ASTM D1238 (190° C./2.16 kg).

In one embodiment, (A) is a copolymer of ethylene with 1-butene or 1-octene; (B) is a LLDPE; and (C) is a LPDE.

In one embodiment, the weight of (A) in the composition is in the range of from 5 to 30% and the weight of (B) is from 60 to 90%, based on the total weight of (A) and (B) (=100%); or the weight of (A) is in the range of from 5 to 30%, the weight of (B) is in the range of from 60 to 90%, and the weight of (C) is in the range of from 1 to 20%, based on the total amount of (A), (B) and (C) (=100%).

In one embodiment, said filler particles of component (ii) are inorganic particles.

In one embodiment, said inorganic particles are selected from the group consisting of: calcium carbonate, calcium sulphate, barium carbonate, barium sulphate, magnesium carbonate, magnesium sulphate, alumina, clay, silica, or mixtures of two or more thereof.

In one embodiment, said liquid of component (iii) is selected from the group consisting of: paraffinic, aromatic, and naphthenic oils; epoxidized oils such as epoxidized soybean oil and epoxidized linseed oil; polyesters of a polybasic acid and a polyol;
polyethers and polyether esters; monocarboxylic acids having from 7 to 12 carbon atoms, and mixtures of two or more thereof.

In a further embodiment, the composition according to the invention further comprises component (iv):
(iv) from 0.01 to 25% by weight of a slip agent, an ignition resistant additive, a stabilizer, a colorant, a pigment, an antioxidant, an antistat, a flow enhancer, a mould release agent, and a nucleating agent, or a mixture of two or more thereof, based on the total weight of the composition.

According to a second aspect, the invention relates to a composite comprising a composition as defined in the first aspect.

In one embodiment, the composite is a layered composite.

In one embodiment, the layered composite is a mass-spring system, wherein the composition as defined in the first aspect forms the barrier layer, and the at least one further layer comprising a material selected from the group consisting of: foam, fleece, felt, fibres, shoddy, or a mixture of two or more thereof, forms the spring layer.

In a further embodiment the layered composite is an absorber-barrier-absorber system comprising the thermoplastic composition as defined in the first aspect or comprising a thermoplastic composition prepared according to the process defined in the third aspect. The absorbing layers can be made of foam, fleece, felt, fibres, shoddy, or a mixture of two or more thereof. One of the absorbing layers can be forming a spring layer for a mass spring system in addition. For a good absorbing function it is beneficial that the foam is made porous, or an open cell foam material is used.

According to as third aspect, the invention relates to a process of making a composition as defined in the first aspect, or making a composite as defined in the second aspect, comprising at least the following steps (P1) and (P3): (P1) mixing components (i) to (iii) and optionally component (iv); (P3) extruding, vacuum moulding, deep drawing, cold moulding, hot moulding, calendering or injection moulding the mixed components (i) to (iii) and optionally component (iv).

According to a fourth aspect, the invention relates to the use of a composition as defined in the first aspect or to the use of a composite as defined in the second aspect or to a composition or to a composite obtained in the process as defined in the third aspect.

In one embodiment, the invention relates to an acoustic insulator comprising a thermoplastic composition as defined in the first aspect, or comprising a composite as defined in the second aspect, or comprising a thermoplastic composition or a composite prepared according to the process defined in the third aspect.

In a further embodiment, the invention relates to a barrier layer of a mass-spring system comprising the thermoplastic composition as defined in the first aspect, or comprising a thermoplastic composition prepared according to the process defined in the third aspect.

In a further embodiment the invention relates to an absorber-barrier-absorber system comprising the thermoplastic composition as defined in the first aspect or comprising a thermoplastic composition prepared according to the process defined in the third aspect. The absorbing layers can be made of foam, felt In still a further embodiment, the invention relates to an automotive part, comprising a thermoplastic composition as defined in the first aspect, or comprising a composite as defined in the second aspect, or comprising a thermoplastic composition or a composite prepared according to the process defined in the third aspect, or comprising the acoustic insulator defined in the fourth aspect or comprising the barrier layer defined in the fourth aspect.

DETAILED DESCRIPTION OF THE INVENTION

First Aspect of the Invention: Thermoplastic Composition

According to a first aspect, the invention relates to a thermoplastic composition comprising at least components (i) to (iii):
(i) from 10 to 50% by weight of a combination of at least one first ethylene polymer (A) and at least one second ethylene polymer (B),
wherein said first ethylene polymer (A) exhibits
(A1) a density of from 0.87 g/cm$^3$-0.90 g/cm$^3$ as determined according to ASTM D792;
(A2) a melt flow index of from 0.3 g/10 min-5 g/10 min as determined according to ASTM D1238 (190° C./2.16 kg);
(A3) a flexural modulus of from 5 to 60 MPa measured according to ASTM D790;
and wherein said at least one second ethylene polymer (B) exhibits
(B1) a density of from 0.90 g/cm$^3$-0.92 g/cm$^3$ as determined according to ASTM D792;
(B2) a melt flow index of from 0.3 g/10 min-10 g/10 min as determined according to ASTM D1238 (190° C./2.16 kg);
(B3) a flexural modulus which is higher than that of (A);
(ii) from 35-90% by weight of inorganic particles as filler;
(iii) from 0.05-20% by weight of a liquid (at 23° C.) as a plasticizer for the at least one first ethylene polymer (A) and/or the at least one second ethylene polymer (B);
the % by weight of components (i) to (iii) being based on the total weight of the composition.

In one embodiment, the composition does not contain propylene polymer having a density equal to or greater than 0.885 g/cm$^3$.

In further embodiments, not only a propylene polymer having a density equal to or greater than 0.885 g/cm$^3$ is excluded from the composition according to the invention, but any propylene polymer, ethylene vinyl acetate (EVA) copolymer, high density polyethylene, thermoplastic rubber, polyvinyl chloride, or any combination thereof.

In one embodiment, the composition according to the invention further comprises at least a third polyethylene polymer (C) which exhibits
(C1) a density of from 0.92 g/cm$^3$-0.97 g/cm$^3$ as determined according to ASTM D792;
(C2) a melt flow index of greater than 15 g/10 min-100 g/10 min as determined according to ASTM D1238 (190° C./2.16 kg).

In a further embodiment, any polymer being different from said at least one first ethylene polymer (A) and said at least one second ethylene polymer (B) and which has repeating units derived from an olefinic monomer, is excluded from the composition according to the invention.

The composition according to the invention may be processed into sheets having a thickness of from 0.2 mm to 5 mm and an area weight of approximately 0.3-10 kg/m$^2$. The corresponding stiffness of the sheets produced from said composition is in a range that is sufficient to allow the sheets to be shipped and transported in stacked form without damage. This is surprising in view of the disclosure of WO 2012/039733. The sheets may be used as barrier layer of a mass-spring system for effective sound-deadening, thus the composition according to the invention may be used in acoustic insulators.

Component (i) in the thermoplastic composition according to the invention comprises at least one first ethylene polymer (A) and at least one second ethylene polymer (B). The composition may optionally further comprise at least one third ethylene polymer (C). Polymers (A), (B) and (C) differ from one another.

The term "ethylene polymer" as used in this disclosure is synonymously used with the term "polyethylene". The term encompasses any polymer containing units derived from ethylene. Such polymers suitable for use in this invention are well known in the art and can be prepared according to known techniques.

According to the invention, said at least one first ethylene polymer (A), said at least one second ethylene polymer (B) and optionally said at least one third polymer (C) span a density range of from 0.87 g/cm$^3$-0.97 g/cm$^3$. Frequently, the density of ethylene polymers is measured with an accuracy of three digits. Accordingly, the range of from 0.87 g/cm$^3$-0.97 g/cm$^3$ encompasses a range of from 0.865 g/cm$^3$-0.974 g/cm$^3$ when measured according to ASTM D792.

Accordingly, the density of polymer (A) may range from 0.865 g/cm$^3$-0.904 g/cm$^3$, the density of polymer (B) may range from 0.895 g/cm$^3$-0.924 g/cm$^3$, and the density of polymer (C) may range from 0.915 g/cm$^3$-0.974 g/cm$^3$.

Said at least one first ethylene polymer (A) and said at least one second ethylene polymer (B) and, optionally, the at least one third ethylene polymer (C) exhibit a melt flow index in the range of from of from 0.3 g/10 min-5 g/10 min, respectively 0.3 g/10 min-10 g/10 min, respectively 15 g/10 min-100 g/10 min, as respectively determined according to ASTM D1238 at 190° C. under a load of 2.16 kg.

The term "melt flow index" as used in this disclosure is synonymously used with terms such as "melt index" or "melt mass flow rate".

In one embodiment, the first ethylene polymer (A) is a polyethylene elastomer, which is inter alia characterized by its flexural modulus of from 5 to 60 MPa measured according to ASTM D790. More precisely, the term "flexural modulus" refers to the 2% secants flexural modulus measured according to ASTM D790.

Without being bound by theory, it is believed that (A) provides for elasticity of the composition according to the invention.

The second ethylene polymer (B) has a flexural modulus that is higher than the one of polymer (A).

In one embodiment, the flexural modulus of polymer (B) is at least twice as high as that of polymer (A), in a further embodiment at least thrice than that of polymer (A).

In a one embodiment, the flexural modulus of polymer (B) is in the range of from 100 to 1,000 MPa measured according to ASTM D790 (in the form of the 2% secant flexural modulus). In further embodiments, the flexural modulus of polymer (A) is in the range of from 120 to 600 MPa, or in the range of from 150 to 400 MPa.

Without being bound by theory, it is believed that polymer (B) provides for sufficient toughness of the composition according to the invention.

Polymer (C) has a melt flow index (MFI) that is much higher than that of polymer (A) and polymer (B). Without being bound by theory, it is believed that polymer (C) supports the processing of polymers (A) and (B).

In a further embodiment, (A) exhibits
(A1) a density of from 0.87 g/cm$^3$-0.89 g/cm$^3$ as determined according to ASTM D792;
(A2) a melt flow index of from 0.5 g/10 min-3 g/10 min as determined according to ASTM D1238 (190° C./2.16 kg);
(A3) a flexural modulus of from 10 to 50 MPa measured according to ASTM D790; and
(B) exhibits
(B1) a density of from 0.90 g/cm$^3$-0.92 g/cm$^3$ as determined according to ASTM D792;
(B2) a melt flow index of from 0.5 g/10 min-7 g/10 min as determined according to ASTM D1238 (190° C./2.16 kg).

In a further embodiment, (A) exhibits
(A1) a density of from 0.87 g/cm$^3$-0.89 g/cm$^3$ as determined according to ASTM D792;
(A2) a melt flow index of from 0.5 g/10 min-3 g/10 min as determined according to ASTM D1238 (190° C./2.16 kg);
(A3) a flexural modulus of from 10 to 40 MPa measured according to ASTM D790; and
(B) exhibits
(B1) a density of from 0.90 g/cm$^3$-0.92 g/cm$^3$ as determined according to ASTM D792;
(B2) a melt flow index of from 0.5 g/10 min-1.5 g/10 min as determined according to ASTM D1238 (190° C./2.16 kg).

If present, (C) may exhibit
(C1) a density of from 0.92 g/cm$^3$-0.95 g/cm$^3$ as determined according to ASTM D792;
(C2) a melt flow index of from 20 g/10 min-90 g/10 min as determined according to ASTM D1238 (190° C./2.16 kg); or
(C1) a density of from 0.925 g/cm$^3$-0.935 g/cm$^3$ as determined according to ASTM D792;
(C2) a melt flow index of from 30 g/10 min-80 g/10 min as determined according to ASTM D1238 (190° C./2.16 kg).

In a further embodiment, (A) exhibits
(A1) a density of from 0.87 g/cm$^3$-0.89 g/cm$^3$ as determined according to ASTM D792;
(A2) a melt flow index of from 0.5 g/10 min-3 g/10 min as determined according to ASTM D1238 (190° C./2.16 kg);
(A3) a flexural modulus of from 10 to 50 MPa measured according to ASTM D790;
(B) exhibits
(B1) a density of from 0.90 g/cm$^3$-0.92 g/cm$^3$ as determined according to ASTM D792;
(B2) a melt flow index of from 0.5 g/10 min-7 g/10 min as determined according to ASTM D1238 (190° C./2.16 kg);
and (C) exhibits
(C1) a density of from 0.92 g/cm$^3$-0.95 g/cm$^3$ as determined according to ASTM D792;
(C2) a melt flow index of from 20 g/10 min-90 g/10 min as determined according to ASTM D1238 (190° C./2.16 kg); or
(C1) a density of from 0.925 g/cm$^3$-0.935 g/cm$^3$ as determined according to ASTM D792;
(C2) a melt flow index of from 30 g/10 min-80 g/10 min as determined according to ASTM D1238 (190° C./2.16 kg).

In a further embodiment, (A) exhibits
(A1) a density of from 0.87 g/cm$^3$-0.89 g/cm$^3$ as determined according to ASTM D792;
(A2) a melt flow index of from 0.5 g/10 min-3 g/10 min as determined according to ASTM D1238 (190° C./2.16 kg);
(A3) a flexural modulus of from 10 to 40 MPa measured according to ASTM D790;
(B) exhibits
(B1) a density of from 0.90 g/cm$^3$-0.92 g/cm$^3$ as determined according to ASTM D792;
(B2) a melt flow index of from 0.5 g/10 min-1.5 g/10 min as determined according to ASTM D1238 (190° C./2.16 kg);
and (C) exhibits
(C1) a density of from 0.92 g/cm$^3$-0.95 g/cm$^3$ as determined according to ASTM D792;
(C2) a melt flow index of from 20 g/10 min-90 g/10 min as determined according to ASTM D1238 (190° C./2.16 kg); or
(C1) a density of from 0.925 g/cm$^3$-0.935 g/cm$^3$ as determined according to ASTM D792;
(C2) a melt flow index of from 30 g/10 min-80 g/10 min as determined according to ASTM D1238 (190° C./2.16 kg).

In one embodiment, the at least one first ethylene polymer (A) and said at least one second ethylene polymer (B) can be independently selected from one another from the group consisting of ethylene copolymers of ethylene with at least one α-olefin.

The term "copolymer of ethylene with at least one α-olefin" as used in this disclosure encompasses a copolymer containing units derived from ethylene and units derived from at least one α-olefin. Such polymers suitable for use in this invention are well known in the art and can be prepared according to known techniques.

In one embodiment, said at least one α-olefin has from 4-20 carbon atoms ($C_4$-$C_{20}$ α-olefins).

Examples of $C_4$-$C_{20}$ α-olefins for constituting the first polyethylene polymer or the second polyethylene polymer or the first polyethylene polymer and the second polyethylene polymer include 1-butene, 1-pentene, 1-hexene, 1-heptene, 1-octene, 1-decene, 1-dodecene, 1-hexadodecene, 4-methyl-1-pentene, 2-methyl-1-butene, 3-methyl-1-butene, 3,3-dimethyl-1-butene, diethyl-1-butene, trimethyl-1-butene, 3-methyl-1-pentene, ethyl-1-pentene, propyl-1-pentene, dimethyl-1-pentene, methylethyl-1-pentene, diethyl-1-hexene, trimethyl-1-pentene, 3-methyl-1-hexene, dimethyl-1-hexene, 3,5,5-trimethyl-1-hexene, methylethyl-1-heptene, trimethyl-1-heptene, dimethyloctene, ethyl-1-octene, methyl-1-nonene, vinylcyclopentene, vinylcyclohexene and vinylnorbornene. Where alkyl branching position is not specified, it is generally on position 3 or higher of the alkene.

In one embodiment, said at least one α-olefin is selected from the group consisting of 1-butene, 1-hexene, and 1-octene, more preferably said at least one α-olefin is selected from 1-butene and 1-octene.

In a further embodiment, said at least one first ethylene polymer (A) is a copolymer of ethylene with 1-butene or 1-octene.

Said at least one second ethylene polymer (B) may be selected from the group consisting of low density polyethylene (LDPE) and linear low density polyethylene (LLDPE). LDPE may be characterized as a homopolymer of ethylene in which polymer chains are branched. LLDPE may be characterized by ethylene which is copolymerized with at least one α-olefin.

In one embodiment, (B) is a LLDPE.

In a further embodiment, (B) is a LLDPE comprising 1-octene or 1-butene.

Both types of ethylene polymers, i.e. LDPE and LLDPE, are well known in the art and may be prepared according to known methods. Further, many types are commercially available.

(C) may be any ethylene polymer, preferably a homopolymer, e.g. LDPE.

In one embodiment, (A) is a copolymer of ethylene with 1-butene or 1-octene; (B) is a LLDPE; and (C) is a LPDE.

Ethylene polymers suitable for the composition according to the invention and which are commercially available may e.g. be selected from polyethylene known as Dowlex™ types (registered trade mark of The Dow Chemical Company ("Dow") or an affiliated company of Dow), Engage™ types (registered trade mark of The Dow Chemical Company ("Dow") or an affiliated company of Dow), Exceed™ types (registered trademark of ExxonMobil), ExxonMobil™ types (registered trademark of ExxonMobil), or from Lotrene™ types (registered trademark of Qatar Petrochemical Company Ltd., but are not limited thereto.

In one embodiment, the composition comprises one polymer (A), one polymer (B) and one polymer (C).

In another embodiment, the composition comprises one polymer (A), two different polymers (B) and one polymer (C).

The relative amounts of polymers (A), (B) and (C) in the composition may be relatively freely selected.

In one embodiment, the weight of (A) in the composition is in the range of from 5 to 30% and the weight of (B) is from 60 to 90%, based on the total weight of (A) and (B) (=100%).

In another embodiment, the weight of (A) is in the range of from 5 to 30%, the weight of (B) is in the range of from 60 to 90%, and the weight of (C) is in the range of from 1 to 20%, based on the total amount of (A), (B) and (C) (=100%).

According to the invention, component (i) constitutes from 10 to 50% by weight of the thermoplastic composition, which in total amounts to 100% by weight. Further preferably, component (i) constitutes from 10 to 40% by weight based on the total weight of the total composition, further preferably from 10 to 30% by weight, further preferably from 10 to 20% by weight, further preferably from 12 to 18% by weight.

The composition of polymers (A), (B) and optionally (C) contained in the composition according to the invention may be analysed using the known crystallization analysis fractionation method commonly referred to as the "CRYSTAF" method. This analysis measures the co-monomer distribution, or Short-Chain Branching Distribution (SCBD), in a polymer via monitoring the concentration of the polymer in solution, while decreasing solution temperature. At a given temperature, depending on the distribution of the co-monomer in the polymer chain, different fractions of the polymers crystallize and precipitate. Accordingly, known polyethylene polymers may be characterized by means of typical fractions obtained in a CRYSTAF analysis. By means of said fractions, the at least one first polymer (A) and the at least one second polymer (B) and optionally the at least one third polymer (C) may be separated from each other and may thus be identified. A fully automated instrument by means of which this analysis may be performed is commercialized by Polymer Char (http://www.polymerchar.com/pdf/Polymer_Char_CRYSTAF_Datasheet.pdf). Said instrument is commercialized under the tradename CRYSTAF. A detailed description of the CRYSTAF method can also be found in the thesis entitled "*Co-crystallization in polyolefin blends studied by various crystallization analysis techniques*", authored by Muhamed Sweed at the University of Stellenbosch in 2006 and available via www.researchgate.com.

Component (ii) in the thermoplastic composition according to the invention is one filler or more fillers. The filler may be selected from organic or inorganic particles. Preferably, said filler or fillers are selected from inorganic particles.

Said inorganic particles of component (ii) may be selected from the group consisting of: calcium carbonate, calcium sulphate, barium carbonate, barium sulphate, magnesium carbonate, magnesium sulphate, alumina, clay, silica, or mixtures of two or more thereof.

In one embodiment, said inorganic particles are calcium carbonate particles and/or barium sulphate particles.

The inorganic particles used as filler or fillers in the present invention may or may not be coated, for example with one or more of components (iii) or (iv), which are described below, such as a fatty acid.

In a further embodiment, the particle size of said inorganic particles is in the range of from 1 to 150 μm, further preferred in the range of from 5 to 125 μm, still further preferred in the range of from 10 to 100 μm.

According to the invention, component (ii) constitutes from 35 to 90% by weight of the thermoplastic composition, which in total amounts to 100% by weight. The filler may be employed in an amount of at least 40% by weight, e.g. at least 50% by weight, or at least 60% by weight, or at least 65% by weight, or at least 70% by weight, or at least 75 by weight, the upper limit being 90% by weight, respectively.

Component (iii) in the thermoplastic composition according to the invention is one plasticizer for the at least one first and/or said at least one second ethylene polymer or more plasticizers for the at least one first and/or said at least one second ethylene polymer, or for a blend comprising said at least first ethylene polymer and said at least second polymer.

The plasticizer ingredient can be selected from several groups. The first group is the group known as processing oils such as paraffinic, aromatic, and naphthenic oils. Naphthenic and paraffinic oils are preferred for uses such as automotive carpet backing.

The second group of plasticizers that are effective, when used in the practice of the present invention, is the group comprising epoxidized oils such as epoxidized soybean oil and epoxidized linseed oil.

The third group of plasticizers that are effective, when used in the practice of the present invention, are polyester which, in general are liquid condensation products of a polybasic acid and a polyol. The term "liquid" in the context of the present invention is used to mean pourable at room temperature, e.g. at 23° C. The acid component is most often a saturated aliphatic dibasic acid, or an aromatic dibasic acid, adipic acid, azelaic acid, phthalic acid, sebacic acid, and glutaric acid, or mixtures of these acids are commonly used. The polyol can be an aliphatic polyol or a polyoxyalkylene polyol, such as ethylene glycol, propylene glycol, 1,4- and 1,3-butane glycol, diethylene glycol, and polyethylene glycol. Preferred polyester compositions would consist of an acid component of which greater than 50 percent by weight are aliphatic polyol or even more preferably aliphatic glycol. Further preferred compositions are based on adipic or azelaic acid, and propylene glycol or the 1,3- or 1,4-butane glycol. The molecular weight of these plasticizers can vary from a low of a few hundred up to a high of about 10,000. The molecular weight of commercial products is seldom specified; however, typically in the trade, the molecular weight range of the product is classified as low, medium, or high. The preferred range for purposes of this invention is that classified as medium.

Mixtures of polyester or epoxidized oils with hydrocarbon oils are also effective plasticizers when used in the present invention. Where a mixture of the polyester plasticizer and a hydrocarbon oil is employed, the relative proportions of the two components can be varied over a wide range depending upon performance objectives. Mixtures containing 50 percent or less of the polyester are preferred for economic reasons, and most preferred are those containing 20 percent or less of the polyester. A fourth group of plasticizers, polyethers and polyether esters, are also effective plasticizers, if used in the composition of the invention. In general, polyethers are oligomers or polymers of alkylene oxides, polymers of ethylene or propylene oxide are the most common types available commercially. Polyethers can be prepared by polymerization of aldehydes using various types of catalysts, or by acid or base catalyzed polymerization of an alkylene oxide, for example. Polyethers can be terminated by hydroxyl groups to form the diol (glycol) or, in the case of adducts of alkylene oxides with glycerol, for example, the triol, and so forth. The hydroxyl terminated polyether can also be reacted with acid, fatty acids such as lauric and stearic acids are common examples of the compounds are the mono- and diesters of polyethylene or polypropylene glycol. The molecular weight of polyethers may range up to those typical of high polymers.

In one embodiment, the plasticizer is a liquid at 23° C. Said liquid as component (iii) may be selected from the group consisting of: paraffinic, aromatic, and naphthenic oils; epoxidized oils such as epoxidized soybean oil and epoxidized linseed oil; polyesters of a polybasic acid and a polyol; polyethers and polyether esters; monocarboxylic acids having from 7 to 12 carbon atoms, and mixtures of two or more thereof.

According to the invention, component (iii) constitutes from 0.05 to 20% by weight of the thermoplastic composition, which in total amounts to 100% by weight. Preferably, component (iii) constitutes from 0.1 to 20% by weight, further preferably 0.1 to 15% by weight, further preferably from 1 to 13% by weight, further preferably from 3 to 12% by weight.

Besides the mandatorily required components (i) to (iii), the thermoplastic composition according to the invention may optionally contain one or more further compounds as a component (iv) that are commonly used in filled thermoplastic polyolefin compositions. These one or more further compounds are referred to in this disclosure as "additive(s)"

Thus, the thermoplastic composition according to the invention may further comprise component (iv):
(iv) from 0.01 to 25% by weight of a slip agent, an ignition resistance additive, a stabilizer, a colorant, a pigment, an antioxidant, an antistat, a flow enhancer, a mold release agent, and a nucleating agent, or two or more thereof, based on the total weight of the composition.

Again, it is to be noted that the respective weight percentages specified in the composition of the invention always add up to 100%.

A slip agent may be selected from the group consisting of: saturated fatty acid amide or ethylene bis(amide), an unsaturated fatty acid amide or ethylene bis(amide) or combinations thereof.

An ignition resistance additive may be selected from the group consisting of: halogenated hydrocarbons, halogenated carbonate oligomers, halogenated diglycidyl ethers, organophosphorous compounds, fluorinated olefins, antimony oxide and metal salts of aromatic sulfur, or a mixture of two or more thereof.

Stabilizers such as light stabilizers may e.g. be selected from sterically hindered amines.

One colorant used as component (iv) is e.g. carbon black.

Antioxidants may be selected from substituted phenols such as 2,6-di-t-butylphenol.

Antistats (antistatic agents) may be selected from the group consisting of:
compounds based on long-chain aliphatic amines and amides, optionally ethoxylated, quaternary ammonium salts, esters of phosphoric acid, polyethylene glycol esters, or polyols.

Flow enhancers that reduce the viscosity of the composition according to the invention when being processed may be e.g. selected from acrylic resins.

A mold release agent may be selected from the group consisting of: stearic acid and metal stearates such as calcium stearate and magnesium stearate.

Further, compounds which stabilize polymer compositions against degradation caused by, but not limited to heat, light, and oxygen, or a mixture thereof may be used. If used, such additives may be present in an amount from at least 0.01% by weight, preferably at least 0.1% by weight, further preferably at least 0.5% by weight, further preferably at least about 1% by weight, further preferably at least 2% by weight, and further preferably at least 5 parts by weight, based on the total weight of the composition. Generally, the additive is present in an amount less than or equal to 25% by weight based on the total weight of composition.

Components (iv) are known the art, i.e. in the processing of polymers, and are commercially available.

In the following further embodiments of the thermoplastic composition according to the invention are enumerated.

In one embodiment, the weights of component
(i) ranges from 10-25% by weight;
(ii) ranges from 70 to 90% by weight;
(iii) ranges from 2 to 12% by weight.

Particularly, the weight of component (i) ranges from 10-20% by weight.

Particularly, the weight of component (ii) ranges from 75 to 85% by weight.

Particularly, the weight of component (iii) ranges from 4 to 10% by weight.

In particular, the combined weights of component
(i) ranges from 10-20% by weight;
(ii) ranges from 75 to 85% by weight;
(iii) ranges from 4 to 10% by weight.

In another embodiment, the weights of component
(i) ranges from 15-50% by weight;
(ii) ranges from 35 to 60% by weight;
(iii) ranges from 2 to 12% by weight.

Particularly, the weight of component (i) ranges from 20-50% by weight.

Particularly, the weight of component (ii) ranges from 35 to 50% by weight.

Particularly, the weight of component (iii) ranges from 4 to 10% by weight.

In particular, the combined weights of component
(i) ranges from 20-50% by weight;
(ii) ranges from 35 to 50% by weight;
(iii) ranges from 4 to 10% by weight.

In one embodiment, the composition is in the form of a sheet or in the form of an injection-moulded article. Methods of converting the composition according to the invention into a sheet are known in the art. Appropriate methods may be selected from the group consisting of: extrusion, vacuum moulding, deep drawing, cold moulding, hot moulding.

In a further embodiment, the composition consists of components (i) to (iii) or components (i) to (iv).

In a further embodiment, the composition according to the invention is part of a composite as defined in the second aspect of the invention.

According to a second aspect, the invention relates to a composite comprising the composition as defined in the first aspect of the invention.

The term "composite" or "composite material" as used in this disclosure encompasses a product that is made from two or more constituents or materials. One constituent is the thermoplastic composition according to the invention and at least one constituent is a material which is different from the thermoplastic composition according to the invention, e.g. one of the materials defined below. The composite may be a layered composite.

In one embodiment, the composition according to the invention is laminated in the layered composite to at least one further layer. This at least one further layer comprises a material selected from the group consisting of: foam, fleece, felt, fibres, shoddy, or a mixture of two or more thereof.

In one embodiment, the layered composite is a mass-spring system, wherein the laminated composition according to the invention forms the barrier layer, and the at least one further layer comprising a material selected from the group consisting of: foam, fleece, felt, fibers, shoddy, or a mixture of two or more thereof, forms the spring layer.

On the opposite surface of the barrier layer, the composite can also be further combined with additional absorbing layers and/or carpet layers and/or decorative layers. These layers together can be formed in an automotive trim part for instance an inner or outer dash.

The composite according to the invention can be further formed into an article selected from the group consisting of: under hood insulation, outer/inner dash insulation, upper/side cowl insulation, throw mats underlay, carpet underlay, floor damper, door insulation, header insulation, rear seat bottom/strainer, rear quarter/pillar trim, package tray, rear wheelhouse, trunk trim or trunk floor.

According to a third aspect, the invention relates to a process of making a composition as defined in the first aspect of the invention, or the composite as defined in the second aspect of the invention, comprising at least the following steps (P1) and (P2):
(P1) mixing components (i) to (iii) and optionally component (iv);
(P3) extruding, vacuum moulding, deep drawing, cold moulding, hot moulding, calendaring or injection moulding the mixed components (i) to (iii) and optionally component (iv).

The term "mixing" in step (P1) as used in this disclosure is synonymously used with the term "blending".

Mixing according to step (P1) may be performed according to methods known in the art including the mixing of components (i) to (iii) and optionally component (iv) in a reactor, blending the individual components or preferably dry blending the individual components, and subsequently melt mixing, e.g., using a suitable mixer, an extruder, roll mill, etc. Suitable mixers are known in the art such as Banbury mixers or equivalent mixers. A Farrel continuous mixer ("FCM") or an extruder such as a screw extruder may also be used. Temperatures in the range of from 160° C. to 200° C. may be used in the mixing step (i).

The melt blended filled thermoplastic polyolefin of the present invention may be first comminuted to pellets, then subsequently extruded to prepare a sheet, or may be extruded directly to prepare a sheet.

However, the composition according to the invention may also be applied to a substrate, preferably by injection-moulding.

Accordingly, in a preferred embodiment, the process further comprises step (P2) prior to step (P3):
(P2) applying the mixture obtained in step (P1) onto a substrate, preferably by injection-moulding or calendering.

The substrate may comprise a material selected from the group consisting of: foam, fleece, felt, fibres, shoddy, or a mixture of two or more thereof.

The composition according to the invention in the form of a sheet may be applied to the substrate, which preferably is provided in the form of a sheet, by a lamination process.

In one embodiment, the composition according to the invention as defined in the first aspect may be applied to a material selected from the group consisting of: foam, fleece, felt, fibres, shoddy, or a mixture of two or more thereof, preferably by injection-moulding. In a subsequent step, the resulting material is subjected to a process selected from the group consisting of: extruding, vacuum moulding, deep drawing, cold moulding, hot moulding or injection moulding.

According to a fourth aspect, the invention relates to the use of a composition as defined in the first aspect or to the use of a composite as defined in the second aspect or to a composition or to a composite obtained in the process as defined in the third aspect.

In one embodiment, the thermoplastic composition according to the invention is used for sound deadening.

The term "sound deadening" as used in this disclosure is synonymously used with terms such as "noise attenuating" or "sound reducing" or "acoustic insulating".

In a further embodiment, the invention relates to an acoustic insulator comprising a thermoplastic composition as defined in the first aspect, or comprising or consisting of a composite as defined in the second aspect, or comprising a thermoplastic composition or comprising or consisting of a composite prepared according to the process as defined in the third aspect.

In another embodiment, the thermoplastic composition according to the invention is used in or as a barrier layer of a mass-spring system.

Accordingly, the invention relates to a barrier layer of a mass-spring system, wherein the barrier layer comprises or consists of the thermoplastic composition as defined in the first aspect or prepared according to a process as defined in the third aspect.

As referred to in the "Background" section of this disclosure, WO 2012/119654 discloses a mass-spring system comprising a mass layer based on a combination of a thin mass barrier layer and a felt top layer. Said mass-spring system comprises at least a mass layer and a decoupling layer adjacent to the mass layer. The composition according to the invention combination may be advantageously used as the mass layer in the mass-spring system as defined in WO 2012/119654.

Accordingly, FIG. 1 shows a schematic view of a mass-spring system comprising a mass layer (barrier layer) 1 comprising or consisting of the composition according to the invention, a decoupling layer 2, optionally an additional felt layer 3 either an absorbing layer, bound but uncompressed felt layer or a felt layer to form an optimized mass layer system as disclosed in WO 2012/119654, and an optional additional acoustic scrim layer or deco layer 4. Layers 3 and 4 can be replaced with, for instance, a tufted or nonwoven carpet with primary backing or combined with an acoustic absorbing layer between carpet and mass layer.

As a "decoupling layer" as used within this disclosure, the standard material used for the spring layer in a classic acoustic mass-spring system can be used in the trim part according to the invention following the same principles. The layer may be formed from any type of thermoplastic and thermosetting foam, closed or open, e.g. polyurethane foam. It can also be made from fibrous materials, e.g. thermo formable fibrous materials, including those derived from natural and/or synthetic fibers. The decoupling layer has preferably a very low compression stiffness of less than 100 kPa. Preferably the decoupling layer is also porous or open pored to enhance the spring effect. In principle the decoupling layer should be attached to the mass layer according to the invention over the entire surface of the part to achieve an optimized effect, however due to the production technique very locally this might not be the case. As the part should function overall as an acoustical mass-spring system, small local areas were the layers are not coupled will not impair the overall attenuation effect.

The thickness of the decoupling layer can be optimized; however, it is mostly depending on space restrictions in the car. Preferably, the thickness can be varied over the area of the part to follow the available space in the car. Normally, the thickness is between 1 and 100 mm, in most areas between 5 and 20 mm.

The combination of the mass layer and the spring layer together forms a classical acoustic insulation.

Optionally, an additional absorbing material can be put on top of the mass layer according to the invention in order to enhance at least partially the absorbing properties. The area weight of the additional layer is preferably between 500 and 2,000 g/m$^2$.

The "absorbing layer" as used within this disclosure, may be formed from any type of thermoplastic and thermosetting foam, e.g. polyurethane foam. However, for the purpose of absorbing noise, the foam must be open pored and/or porous to enable the entrance of sound waves according to the principles of sound absorption, as known in the art. The absorbing layer can also be made from fibrous materials, e.g. thermoformable fibrous materials, including those derived from natural and/or synthetic fibers.

The airflow resistance (AFR) of the absorbing layer is preferably at least 200 Nsm$^{-3}$, preferably between 500 and 2,500 Nsm$^{-3}$. Also absorbing systems with more than one absorbing layer can be put on top of the mass layer.

Also an additional scrim can be put on top of either the absorbing material to enhance even further the acoustic absorption and/or to protect the underlying layers, for instance against water etc.

A "scrim" as used in this disclosure is a thin nonwoven with a thickness between 40 µm and around 1 mm, preferably between 40 µm and 0.5 mm, and an increased airflow resistance. It preferably has an airflow resistance (AFR) of between 500 and 3,000 Nsm$^{-3}$, more preferably of between 1,000 and 1,500 Nsm$^{-3}$. The scrim and the underlying absorbing layer preferably differ in AFR in order to obtain an increased absorption. Preferably, the AFR of the scrim differs from the AFR of the absorbing layer.

The area weight of the scrim layer can be between 50 and 250 g/m$^2$, preferably between 80 and 150 g/m$^2$.

The "scrims" or "scrim layers" as used in this disclosure can be made from continuous or staple fibers or fiber mixtures. The fibers can be made by melt blown or spun bond technologies. They can also be mixed with natural fibers. The scrims are for example made of polyester, or polyolefin fibers or a combination of fibers for instance of polyester and cellulose, or polyamide and polyethylene, or polypropylene and polyethylene.

Alternatively, the mass-spring system comprising the barrier layer according to the invention can be combined with a tufted carpet surface layer, for instance as disclosed in EP 2432925, or a needle punch carpet layer, for instance the needle punch carpet as disclosed in PCT/EP2013/059501.

Accordingly, in one embodiment, the invention relates to multilayer composite for acoustic insulation comprising a mass layer (barrier layer) and a decoupling layer, wherein the mass layer comprises or consists of the material as defined in the first aspect of the invention.

In one embodiment, the decoupling layer is a felt or foam layer. The multilayer composite may include at least one additional layer in the form of a scrim, a nonwoven fleece, an absorbing layer in the form of foam or felt layer, a nonwoven carpet or a tufted carpet layer.

In a further embodiment, the invention relates to an automotive part, comprising a thermoplastic composition as defined in the first aspect, or comprising a composite as defined in the second aspect, or comprising a thermoplastic composition or a composite prepared according to the process defined in the third aspect, or comprising the acoustic insulator or comprising the barrier layer defined herein.

The term "automotive part" as used herein encompasses any part that can found in an assembled car.

EXAMPLES

Example 1

7.0% by weight of Dowlex™ 2035G (LLDPE; density 0.919 g/cm$^3$; melt index 6.0 g/10 min), 7.0% by weight of Dowlex™ 2045G (LLDPE; density 0.920 g/cm³; melt index 1.0 g/10 min) [polyethylene resin (B)], 2.06% by weight of Engage™ 8457 (ethylene-octene copolymer; density 0.877 g/cm³; melt flow index 3.0 g/10 min) [polyethylene resin (A)], 80.40% by weight of calcium carbonate, 0.14% by weight of carbon black and 3.4% by weight of palm oil are dry blended and continuously feed to a Banbury mixer. The molten material is conveyed to a single screw extruder, which is temperature controlled at approximately 150° C. The material is extruded through a die and then through two calendar rolls, which have a temperature between 70 to 90° C. and a roll gap of 0.5 mm. The resulting sheet may be used as a barrier layer of a mass-spring system.

Example 2

The barrier layer produced according to Example 1 is laminated onto a felt as a spring layer at a temperature of between 120° C. to 160° C. using IR radiation as the heat source. The resulting mass-spring system in the form of a composite may be used as an acoustic insulator, e.g. for reducing noise in the cabin of a vehicle.

Example 3

Example 1 was repeated with the difference that 6.75% by weight of Dowlex™ 2035G, 6.75% by weight of Dowlex™ 2045G and 0.5% by weight of an LDPE having a melt flow index of 70 g/10 min and a density of about 0.92 g/cm³ [polyethylene resin (C)] was used (e.g. Lotrene® MG 70).

The invention claimed is:

1. A thermoplastic composition, comprising:
   from 10 to 50% by weight of a combination of at least one first ethylene polymer, at least one second ethylene polymer, and at least one third ethylene polymer,
   wherein the first ethylene polymer has the following properties:
      a density in the range of 0.87 g/cm³ to 0.90 g/cm³;
      a melt flow index in the range of 0.3 g/10 min to 5 g/10 min; and
      a flexural modulus in the range of 5 MPa to 60 MPa;
   wherein the second ethylene polymer has the following properties:
      a density in the range of 0.90 g/cm³ to 0.92 g/cm³;
      a melt flow index in the range of 0.3 g/10 min to 10 g/10 min; and
      a flexural modulus which is higher than that of the first ethylene polymer; and
   wherein the third ethylene polymer has the following properties:
      a density in the range of 0.92 g/cm³ to 0.97 g/cm³; and
      a melt flow index in the range of 15 g/10 min to 100 g/10 min;
   from 35 to about 90% by weight of inorganic particles as filler; and
   from 0.05 to 20% by weight of a liquid (at 23° C.) which acts as a plasticizer for at least one of the at least one first ethylene polymer, the at least one second ethylene polymer, and the at least one third ethylene polymer; and
   wherein each density is determined according to ASTM D792, each melt flow index is determined according to ASTM D1238, at 190° C. and 2.16 kg, and each flexural modulus is determined according to ASTM D790.

2. The composition of claim 1, wherein the at least one third polyethylene polymer has one of the following property sets:
   a density in the range of 0.92 g/cm³ to 0.95 g/cm³; and a melt flow index in the range of 20 g/10 min to 90 g/10 min; or
   a density in the range of 0.925 g/cm³ to 0.935 g/cm³; and a melt flow index in the range of 30 g/10 min to 80 g/10 min.

3. The composition of claim 2, wherein one of the following conditions applies:
   the first ethylene polymer has the following property set:
      a density in the range of 0.87 g/cm³ to 0.89 g/cm³,
      a melt flow index in the range of 0.5 g/10 min to 3 g/10 min, and
      a flexural modulus in the range of 10 MPa to 50 MPa; and
   the second ethylene polymer has the following property set:
      a density in the range of 0.90 g/cm³ to 0.92 g/cm³, and
      a melt flow index in the range of 0.5 g/10 min to 7 g/10 mi; or
   the first ethylene polymer has the following property set:
      a density in the range of 0.87 g/cm³ to 0.89 g/cm³,
      a melt flow index in the range of 0.5 g/10 min to 3 g/10 min, and
      a flexural modulus in the range of 10 MPa to 40 MPa; and
   the second ethylene polymer has the following property set:
      a density in the range of from 0.90 g/cm³ to 0.92 g/cm³, and a melt flow index in the range of from 0.5 g/10 min to 1.5 g/10 min.

4. The composition of claim 1, wherein the first ethylene polymer is a copolymer of ethylene with 1-butene or 1-octene;
   the second ethylene polymer is a linear low density polyethylene (LLDPE); and the third ethylene polymer is a low density polyethylene (LDPE).

5. The composition of claim 1, wherein the weight of the first ethylene polymer is in the range of from 5 to 30%, the weight of the second ethylene polymer is in the range of from 60 to 90%, and the weight of the third ethylene polymer is in the range of from 1 to 20%, based on the total amount of the respective first, second and third ethylene polymers.

6. The composition of claim 1, wherein the inorganic particles as filler are selected from the group consisting of: calcium carbonate, calcium sulphate, barium carbonate, barium sulphate, magnesium carbonate, magnesium sulphate, alumina, clay, silica, and mixtures thereof.

7. The composition of claim 1, wherein the liquid is selected from the group consisting of: paraffinic oil, aromatic oil, naphthenic oils, epoxidized oils, polyesters of a polybasic acid and a polyol, polyethers, polyether esters, monocarboxylic acids having from 7 to 12 carbon atoms, and mixtures thereof.

8. The composition of claim 1, further comprising:
   a component amounting to from 0.01 to 25% by weight, based on the total weight of the composition, selected from the group consisting of: a slip agent, an ignition resistant additive, a stabilizer, a colorant, a pigment, an antioxidant, an antistat, a flow enhancer, a mold release agent, a nucleating agent, and mixtures thereof.

9. The composition of claim 1, wherein one of the following conditions applies:
- the first ethylene polymer has the following property set:
  - a density in the range of 0.87 g/cm$^3$ to 0.89 g/cm$^3$, a melt flow index in the range of 0.5 g/10 min to 3 g/10 min, and a flexural modulus in the range of 10 MPa to 50 MPa;
- and the second ethylene polymer has the following property set:
  - a density in the range of 0.90 g/cm$^3$ to 0.92 g/cm$^3$, and a melt flow index in the range of 0.5 g/10 min to 7 g/10 min; or
- the first ethylene polymer has the following property set:
  - a density in the range of 0.87 g/cm$^3$ to 0.89 g/cm$^3$, a melt flow index in the range of 0.5 g/10 min to 3 g/10 min and a flexural modulus in the range of 10 MPa to 40 MPa; and
- the second ethylene polymer has the following property set: a density in the range of from 0.90 g/cm$^3$ to 0.92 g/cm$^3$, and a melt flow index in the range of from 0.5 g/10 min to 1.5 g/10 min.

10. A layered composite material comprising a barrier layer, wherein the barrier layer comprises the thermoplastic composition of claim 1.

11. The layered composite material of claim 10 further comprising a spring element layer, wherein the spring element layer comprises a material selected from the group consisting of: foam, fleece, felt, fibers, shoddy, and mixtures thereof.

* * * * *